UNITED STATES PATENT OFFICE.

ANDRÉ DORFMAN, OF SCHUMACHER, ONTARIO, CANADA, ASSIGNOR TO McINTYRE PORCUPINE MINES LIMITED, OF TORONTO, ONTARIO, CANADA.

TREATMENT OF GOLD AND SILVER ORES.

1,411,326.  Specification of Letters Patent.  Patented Apr. 4, 1922.

No Drawing.  Application filed June 20, 1921. Serial No. 479,147.

*To all whom it may concern:*

Be it known that I, ANDRÉ DORFMAN, a citizen of the Republic of Switzerland, and resident of Schumacher, in the District of Temiskaming, Province of Ontario, Canada, have invented certain new and useful Improvements in the Treatment of Gold and Silver Ores, of which the following is a specification.

This invention relates particularly to improvements in the treatment of certain ores, which cannot at the present be economically treated by the well known cyanide process, in order to render them amenable to such treatment. It has been found, for example, that certain forms of organic matter and certain forms of carbonaceous material which are found in ores, or which are present from previous treatments, have a tendency to either prevent the economical dissolution of the precious metals or have a decomposing or precipitating action on the double cyanide of gold or silver formed by the reaction of the cyanide with these metals. This is particularly true of the concentrates from the flotation process of concentration and of certain ores found in the Porcupine District of Ontario which have been subjected to certain physical and chemical changes, the result of which has been the contamination of these valuable veins with a carbonaceous schist, called locally graphitic schist, consisting mainly of a form of carbon intermediate between anthracite and graphite. This carbonaceous matter when brought in contact with the cyanide solutions used in the milling of the ore has the detrimental effect of prematurely precipitating out the gold and the silver from the solutions and this once precipitated gold and silver cannot be re-dissolved by any strength of cyanide solution. In fact, the presence of only 1% of carbonaceous matter in the ore renders the mining of such an ore commercially unprofitable, as from repeated experiments it is found that one pound of carbon in the ore will precipitate at least $2.00 worth of gold.

My object therefore is to devise a process of treating such ores which will enable substantially as large a percentage of the precious metal to be recovered as from ordinary ores and without material increase in cost.

I attain my object by treating the ore during or after crushing and before cyanidation with a mineral oil such as crude oil, fuel oil or kerosene or analogous hydrocarbons. In practice crude petroleum oil is found to give satisfactory results. Vegetable and animal oils are not, however, suitable as far as the applicant's experiments have gone.

In practice, if the oil is added during crushing, the oil is fed into the first wet-crushing machine with the ore and water either in a small stream or in drips. During the process of crushing and grinding, the oil is adsorbed by the liberated particles of carbonaceous material, for which it seems to have a strong affinity. If the addition of oil is made after crushing, the ore is agitated with the oil in the presence of water, or in a weak barren cyanide solution, that is, the regular mill solution after the precious metals have been precipitated and which usually contains about 50% of the original quantity of cyanide.

The further treatment of the ore after the treatment with the oil follows ordinary lines. The amount of oil necessary to neutralize any precipitating action of carbonaceous material is determined by the percentage of carbon in the ore. For example, in the McIntyre mine in the Porcupine District, the graphitic schist contains about 7% of carbon. In one test fifty tons of ore containing 20% of graphitic schist or 28 pounds of carbon was successfully treated in cyanide after a pre-treatment with 6 pounds of crude oil.

What I claim as my invention is:—

1. In the cyanide process of recovering gold and silver from ores containing organic or carbonaceous matter, the preliminary step which consists in treating the ore during or after crushing with a small quantity of a mineral oil.

2. In the cyanide process of recovering gold and silver from ores containing organic or carbonaceous matter, the preliminary step which consists in treating the ore during or after crushing with a mineral oil in the proportion of from 0.2 pounds to 0.3 pounds of oil to each pound of carbon present in the ore.

Signed at Timmens, Ontario, Canada, this tenth day of June, 1921.

ANDRÉ DORFMAN. [L. S.]

Witnesses:
D. J. ALLEN,
D. W. O'SULLIVAN.